United States Patent
Rico Alvarino et al.

(10) Patent No.: US 10,292,176 B2
(45) Date of Patent: May 14, 2019

(54) SUBFRAME AVAILABILITY FOR MACHINE TYPE COMMUNICATIONS (MTC)

(71) Applicant: QUALCOMM Incorporated, San Diego, CA (US)

(72) Inventors: Alberto Rico Alvarino, San Diego, CA (US); Peter Gaal, San Diego, CA (US); Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 15/177,006

(22) Filed: Jun. 8, 2016

(65) Prior Publication Data

US 2017/0019911 A1     Jan. 19, 2017

Related U.S. Application Data

(60) Provisional application No. 62/193,579, filed on Jul. 16, 2015, provisional application No. 62/244,641, (Continued)

(51) Int. Cl.
*H04W 72/12* (2009.01)
*H04L 5/00* (2006.01)
(Continued)

(52) U.S. Cl.
CPC ............ *H04W 72/121* (2013.01); *H04B 3/36* (2013.01); *H04B 7/0413* (2013.01);
(Continued)

(58) Field of Classification Search
CPC ..... H04W 72/121; H04W 4/70; H04W 8/082; H04W 16/32; H04W 72/0413;
(Continued)

(56) References Cited

U.S. PATENT DOCUMENTS

2014/0301255 A1   10/2014  Yin et al.
2015/0003302 A1    1/2015  Ekpenyong
(Continued)

FOREIGN PATENT DOCUMENTS

CA    2925697 A1    4/2015
EP    2919402 A1    9/2015
(Continued)

OTHER PUBLICATIONS

New Postcom: "UL Coverage Improvement and Evaluation for Low Cost MTC", 3GPP Draft; R1-131128 UL Coverage Improvement and Evaluation for Low Cost MTC, 3rd Generation Partnership Project (3GPP), Mobile Competence Centre; 658, Route Des Lucioles; F-86921 Sophia-Antipolis, vol. RAN WG1, No. Chicago, USA; Apr. 15, 2013-Apr. 19, 2013 Apr. 6, 2013 (Apr. 6, 2013), XP050697060, Retrieved from the Internet: URL:http://www.3gpp.org/ftp/tsg_ran/WG1_RL 1/TSGR1_72b/Docs/ [retrieved on Apr. 6, 2013].
(Continued)

*Primary Examiner* — Luat Phung
(74) *Attorney, Agent, or Firm* — Patterson & Sheridan, LLP

(57) ABSTRACT

Certain aspects of the present disclosure generally relate to wireless communications and more specifically to a method for machine type communications involving identifying one or more subframes, within at least one radio frame, unavailable for bundled transmissions across multiple subframes and communicating, via at least one narrowband region within a wider system bandwidth, using bundled transmissions across multiple subframes based on the identification.

23 Claims, 11 Drawing Sheets

Related U.S. Application Data filed on Oct. 21, 2015, provisional application No. 62/292,204, filed on Feb. 5, 2016.

(51) Int. Cl.

| | | |
|---|---|---|
| *H04B 3/36* | (2006.01) | |
| *H04B 7/0413* | (2017.01) | |
| *H04L 5/14* | (2006.01) | |
| *H04W 8/08* | (2009.01) | |
| *H04W 16/32* | (2009.01) | |
| *H04W 72/04* | (2009.01) | |
| *H04W 72/14* | (2009.01) | |
| *H04W 4/70* | (2018.01) | |
| *H04L 12/70* | (2013.01) | |
| *H04W 88/12* | (2009.01) | |

(52) U.S. Cl.
CPC .......... *H04L 5/0044* (2013.01); *H04L 5/0053* (2013.01); *H04L 5/14* (2013.01); *H04W 4/70* (2018.02); *H04W 8/082* (2013.01); *H04W 16/32* (2013.01); *H04W 72/042* (2013.01); *H04W 72/0413* (2013.01); *H04W 72/14* (2013.01); *H04L 2012/5624* (2013.01); *H04W 88/12* (2013.01)

(58) Field of Classification Search
CPC ... H04W 72/042; H04W 72/14; H04W 88/12; H04B 3/36; H04B 7/0413; H04L 5/0044; H04L 5/0053; H04L 5/14; H04L 2012/5624
See application file for complete search history.

(56) References Cited

U.S. PATENT DOCUMENTS

| | | | |
|---|---|---|---|
| 2015/0156671 | A1 | 6/2015 | Kuchibhotla et al. |
| 2015/0245323 | A1* | 8/2015 | You ..................... H04W 72/042 370/329 |
| 2016/0007383 | A1* | 1/2016 | Chae ..................... H04W 76/14 455/404.1 |
| 2016/0135143 | A1* | 5/2016 | Won ..................... H04W 72/005 370/312 |
| 2016/0242203 | A1* | 8/2016 | You ......................... H04W 4/70 |
| 2017/0180098 | A1* | 6/2017 | You ....................... H04L 5/0053 |
| 2018/0054289 | A1* | 2/2018 | Kim ......................... H04W 4/38 |

FOREIGN PATENT DOCUMENTS

| | | |
|---|---|---|
| GB | 2510140 A | 7/2014 |
| WO | WO-2014109411 A1 | 7/2014 |
| WO | WO-2014109621 A1 | 7/2014 |

OTHER PUBLICATIONS

Partial International Search Report—PCT/US2016/036649—ISA/EPO—dated Sep. 6, 2016.

International Search Report and Written Opinion—PCT/US2016/036649—ISA/EPO—dated Nov. 22, 2016.

New Postcom: "UL Coverage Improvement and Evaluation for Low Cost MTC", 3GPP Draft; R1-131120 UL Coverage Improvement and Evaluation for Low Cost MTC, 3rd Generation Partnership Project (3GPP), Mobile Competence Centre; 650, Route Des Lucioles; F-06921 Sophia-Antipolis, vol. RAN WG1, No. Chicago, USA; Apr. 15, 2013-Apr. 19, 2013, Apr. 6, 2013 (Apr. 6, 2013), 4 Pages, XP050697060, Retrieved from the Internet: URL: http://www.3gpp.org/ftp/tsg_ran/WG1_RL1/TSGR1_72b/Docs/ (retrieved on Apr. 6, 2013].

* cited by examiner

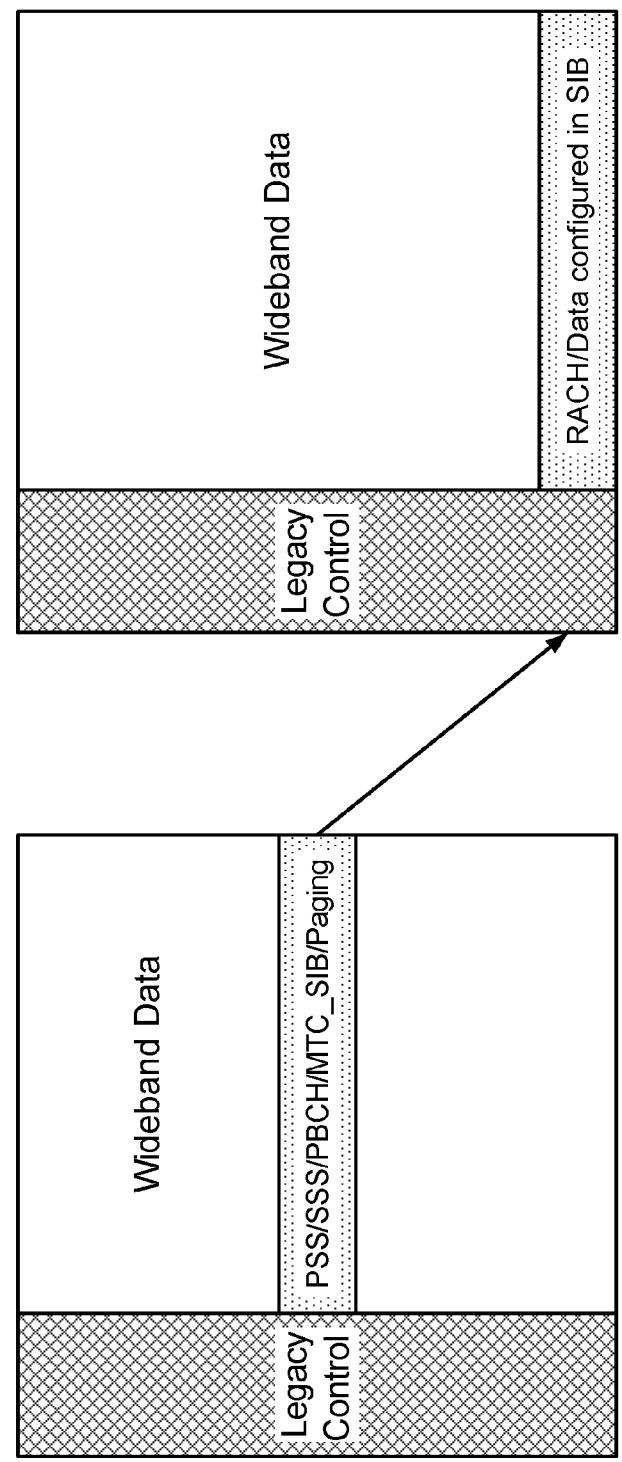
FIG. 5A
FIG. 5B

- Postpone

- Skip (effective bundle size of 4)

- Example: Bundle size 10

- If UE uses Cfg 1 and cell uses cfg. 2, UL bundling will collide with DL transmission
- If UE uses Cfg 2 and cell uses cfg. 1, DL bundling will collide with UL transmission

SUBFRAME AVAILABILITY FOR MACHINE TYPE COMMUNICATIONS (MTC)

CLAIM OF PRIORITY UNDER 35 U.S.C. § 119

The present Application for Patent claims benefit of U.S. Provisional Patent Application Serial Nos. 62/193,579, filed Jul. 16, 2015, 62/244,641, filed Oct. 21, 2015, and 62/292,204, filed Feb. 5, 2016, each assigned to the assignee hereof and hereby expressly incorporated by reference herein.

BACKGROUND

I. Field of the Invention

Certain aspects of the present disclosure generally relate to wireless communications and more specifically to systems utilizing devices with limited communications resources, such as machine type communication (MTC) devices and enhanced MTC (eMTC) devices.

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, navigation devices, gaming devices, cameras, tablets, laptop computers, netbooks, smartbooks, ultrabooks, etc. Some UEs may be considered machine type communication (MTC) UEs, which may include remote devices, such as sensors, meters, monitors, location tags, drones, trackers, robots, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To enhance coverage of certain devices, such as MTC devices, "bundling" may be utilized in which certain transmissions are sent as a bundle of transmissions, for example, with the same information transmitted over multiple subframes.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes identifying one or more subframes, within at least one radio frame, unavailable for bundled transmissions across multiple subframes and communicating, via at least one narrowband region within a wider system bandwidth, using bundled transmissions across multiple subframes based on the identification.

Certain aspects of the present disclosure provide a method for wireless communications by a user equipment (UE). The method generally includes determining a first set of subframes for valid downlink reception, determining a second set of subframes, determining a third set of subframes for valid downlink reception, based at least on the first set of subframes and the second set of subframes, receiving a downlink channel in the third set of subframes for valid downlink reception. In some cases, determining the third set of subframes for valid downlink reception comprises determining subframes which are contained in the first set of subframes for valid downlink reception and not contained in the second set of subframes. Details of such determination are described below.

Certain aspects of the present disclosure provide a method for wireless communications by a user equipment (UE). The method generally includes determining a duplexing mode of a communication link, receiving system information for the determined duplexing mode, and identifying subframes available for uplink and downlink transmission based at least on the received system information.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 5A and 5B illustrate an example of MTC co-existence within a wideband system, such as LTE, in accordance with certain aspects of the present disclosure.

DETAILED DESCRIPTION

Aspects of the present disclosure provide techniques and apparatus for determining availability of subframes for bundled transmission. As will be described in greater detail below, the availability (and how to transmit based on the availability) may be determined based on various factors, such as the reason subframes unavailable, reference (and/or signaled) subframe configurations, and the type of channel subject to the bundled transmission.

Accordingly, as will be described in more detail below, the techniques presented herein may allow bundled uplink and downlink transmissions for cells with MTC devices.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

Figure 1:
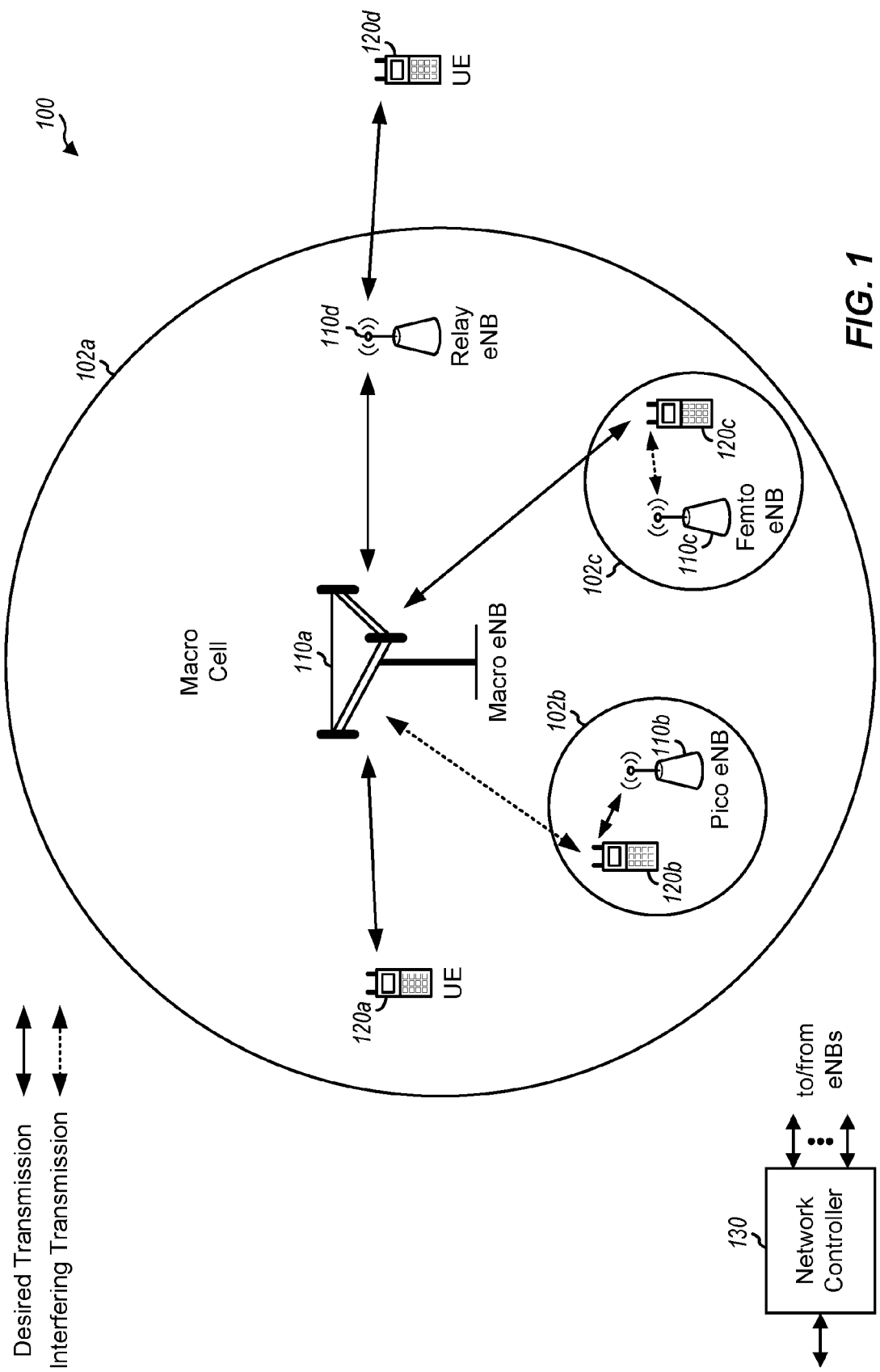
FIG. 1 is a block diagram conceptually illustrating an example wireless communication network, in accordance with certain aspects of the present disclosure.

FIG. 1 illustrates an example wireless communication network 100 with base stations (BSs) and user equipments (UEs), in which aspects of the present disclosure may be practiced.

For example, one or more paging procedure enhancements for certain UEs (e.g., LC MTC UEs, LC eMTC UEs, etc.) in the wireless communication network 100 may be supported. According to the techniques presented herein, the BSs and LC UE(s) in the wireless communication network 100 may be able to determine, from the available system bandwidth supported by the wireless communication network 100, which narrowband region(s) the LC UE(s) should monitor for a bundled paging message transmitted from the BSs in the wireless communication network 100. Also, according to techniques presented herein, the BSs and/or LC UE(s) in the wireless communication network 100 may be able to determine and/or adapt the bundling size for the paging message based on one or more triggers in the wireless communication network 100.

The wireless communication network 100 may be an LTE network or some other wireless network. Wireless communication network 100 may include a number of evolved NodeBs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc.

One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

Figure 2:
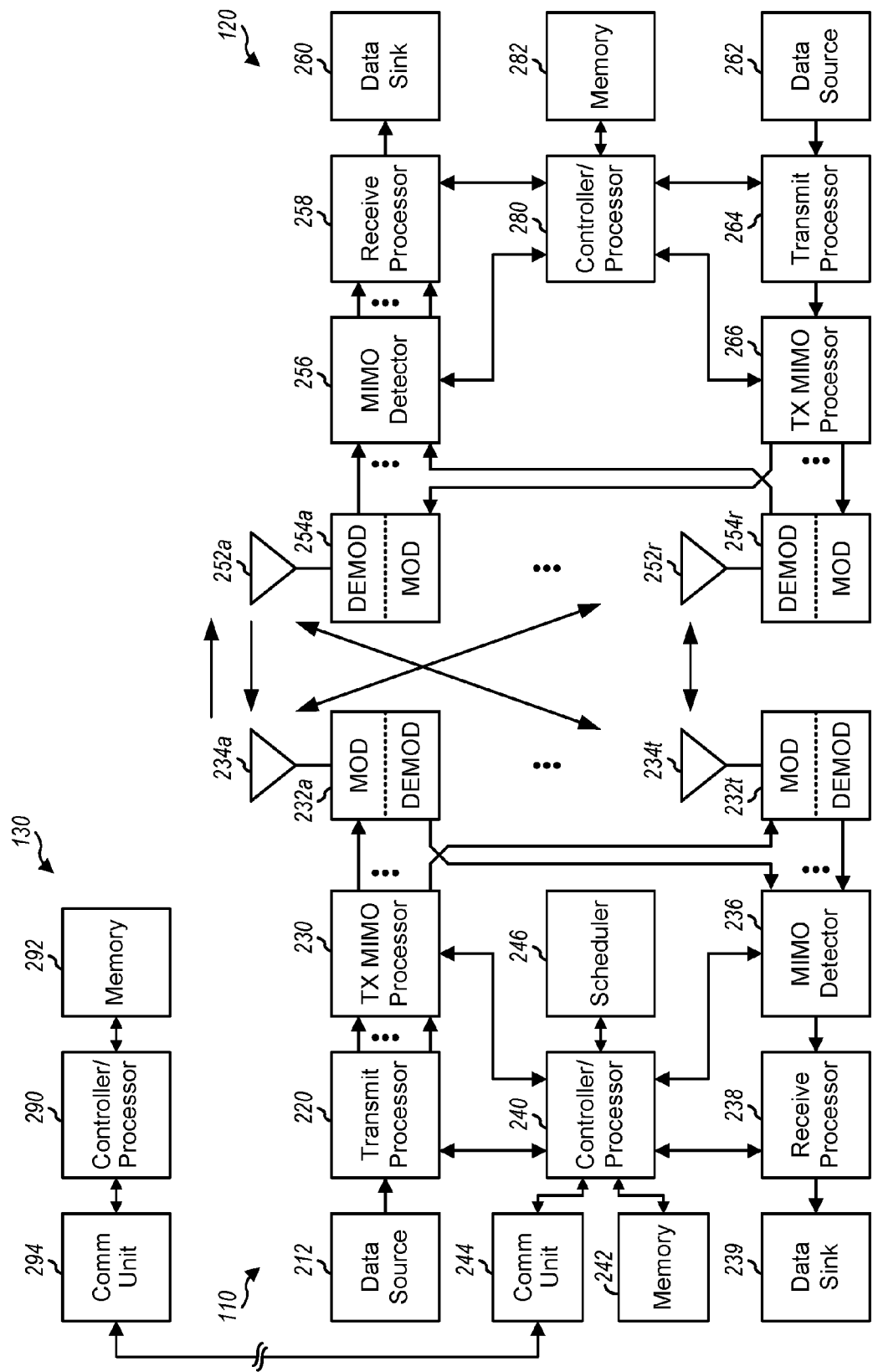
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations illustrated in FIGS. 7 and 11 and/or other processes for the techniques described herein. Similarly, controller/processor 280 and/or other processors and modules at UE 120 may perform or direct operations illustrated in FIGS. 8 and 12 and/or processes for the techniques described herein. Memories 242 and 282 may store data and program codes for BS 110 and UE 120, respectively. A scheduler 246 may schedule UEs for data transmission on the downlink and/or uplink.

Figure 3:
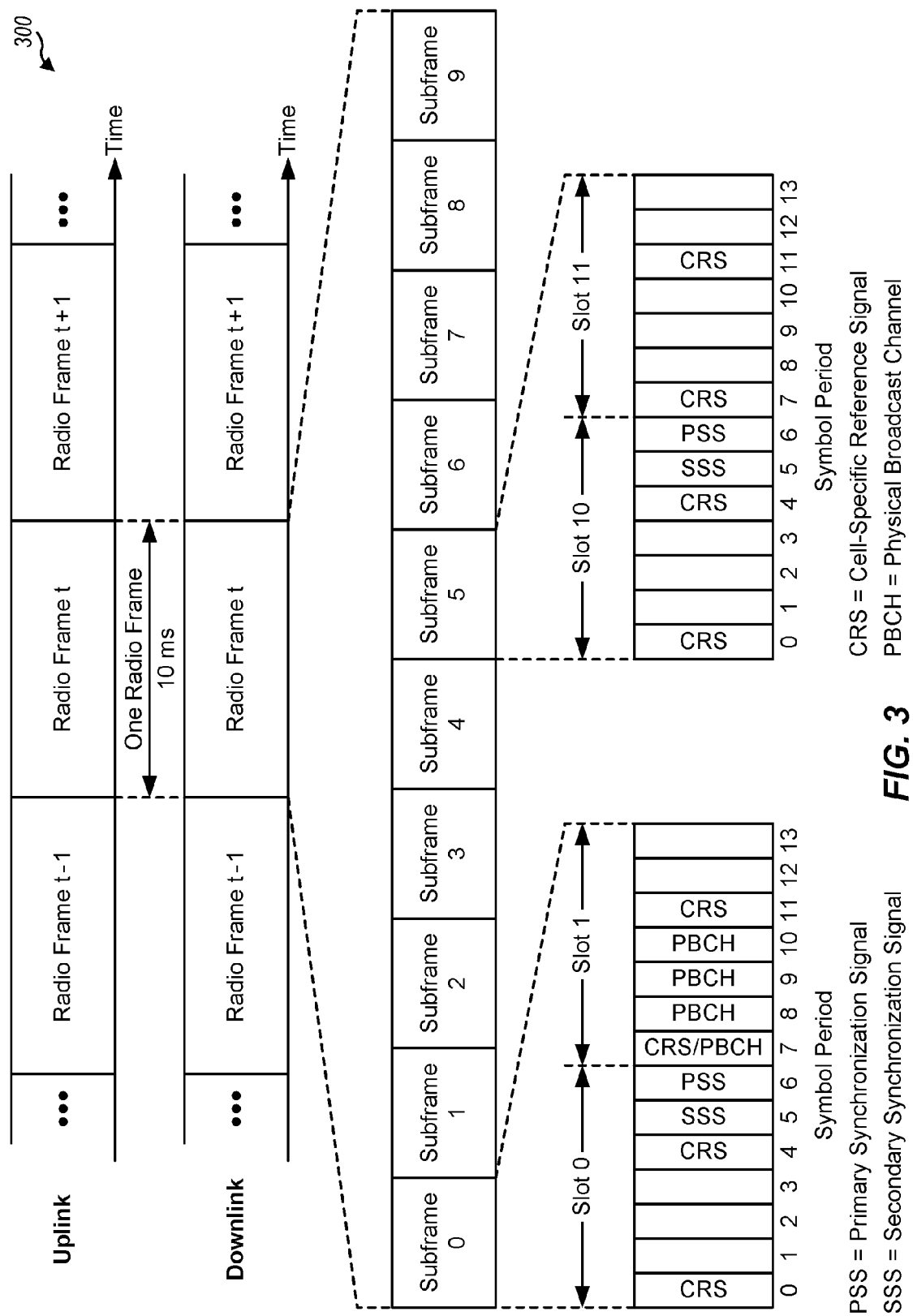
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames.

Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
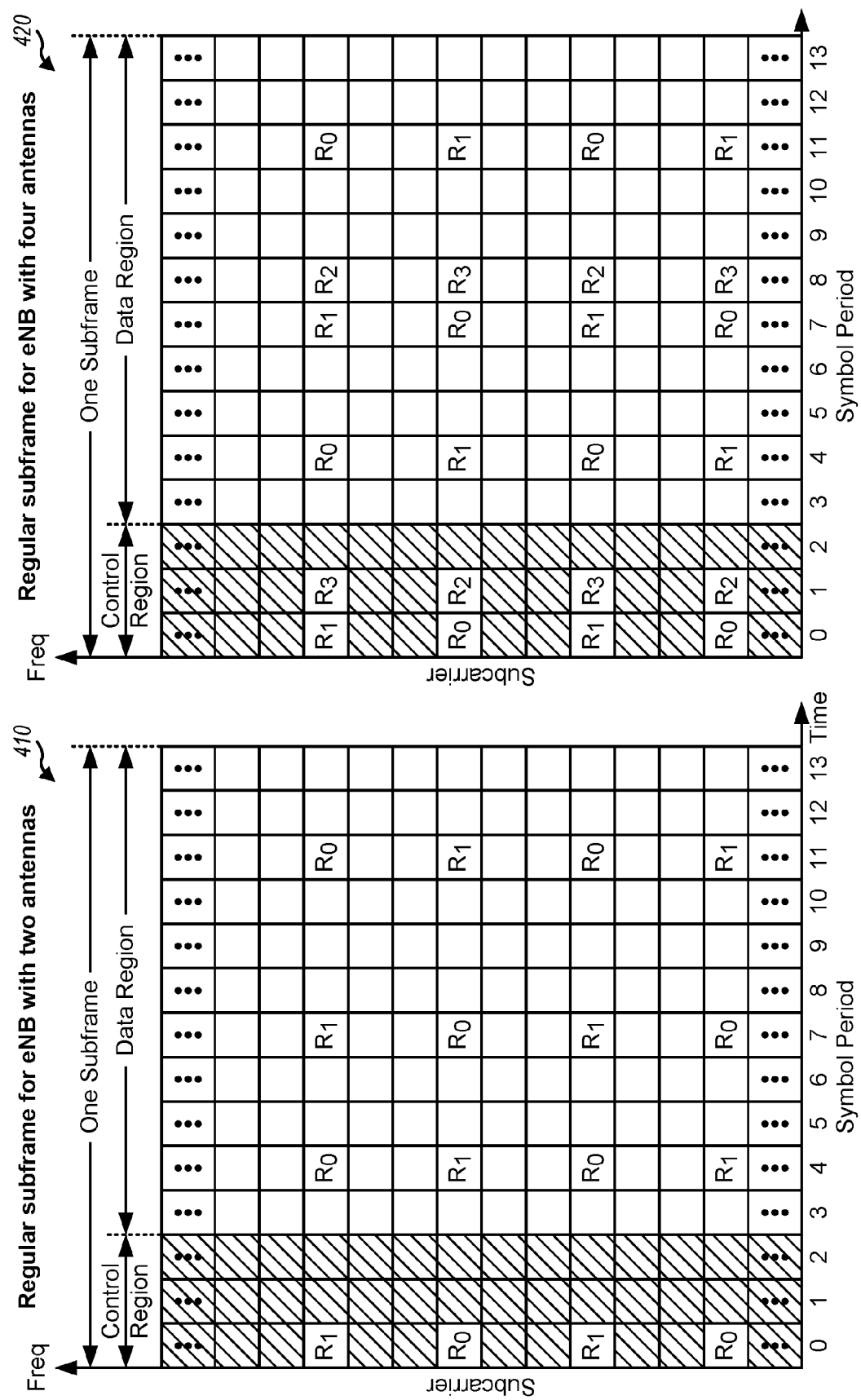
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13, the LC UE may be limited to a particular narrowband assignment (e.g., of no more than six resource blocks (RBs)) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. In some cases, a determination may be made as to whether or not the UE is in a coverage enhancement (CE) mode and transmission may be adjusted based on the determination. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may be able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

Example MTC Coexistence within a Wideband System

As mentioned above, MTC and/or eMTC operation may be supported in the wireless communication network (e.g., in coexistence with LTE or some other RAT). FIGS. 5A and 5B, for example, illustrate an example of how LC UEs in MTC operation may co-exist within a wideband system, such as LTE.

As illustrated in the example frame structure of FIG. 5A, subframes associated with MTC and/or eMTC operation may be time division multiplexed (TDM) with regular subframes associated with LTE (or some other RAT).

Additionally or alternatively, as illustrated in the example frame structure of FIG. 5B, one or more narrowband regions used by LC UEs in MTC may be frequency division multiplexed within the wider bandwidth supported by LTE. Multiple narrowband regions, with each narrowband region spanning a bandwidth that is no greater than a total of 6 RBs, may be supported for MTC and/or eMTC operation. In some cases, each LC UE in MTC operation may operate within one narrowband region (e.g., at 1.4 MHz or 6 RBs) at a time. However, LC UEs in MTC operation, at any given time, may re-tune to other narrowband regions in the wider system bandwidth. In some examples, multiple LC UEs may be served by the same narrowband region. In other examples, multiple LC UEs may be served by different narrowband regions (e.g., with each narrowband region spanning 6 RBs). In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 5B, a first narrowband region (e.g., spanning no more than 6 RBs of the wideband data) of a subframe may be monitored by one or more LC UEs for either a PSS, SSS, PBCH, MTC signaling, or paging transmission from a BS in the wireless communication network. As also shown in FIG. 5B, a second narrowband region (e.g., also spanning no more than 6 RBs of the wideband data) of a subframe may be used by LC UEs to transmit a RACH or data previously configured in signaling received from a BS. In some cases, the second narrowband region may be utilized by the same LC UEs that utilized the first narrowband region (e.g., the LC UEs may have re-tuned to the second narrowband region to transmit after monitoring in the first narrowband region). In some cases (although not shown), the second narrowband region may be utilized by different LC UEs than the LC UEs that utilized the first narrowband region.

Although the examples described herein assume a narrowband of 6 RBs, those skilled in the art will recognize that the techniques presented herein may also be applied to different sizes of narrowband regions.

Example Subframe Availability for eMTC UEs

As mentioned above, LC MTC UEs were introduced in LTE Rel-12. Additional enhancements may be made in LTE Release 13 (Rel-13) to support MTC operations. For example, MTC UEs may be able to operate (e.g., monitor, transmit, and receive) in a narrowband region of 1.4 MHz or six RBs within wider system bandwidths (e.g., 1.4 MHz, 3 MHz, 5 MHz, 10 MHz, 15 MHz, 20 MHz). As a second example, base stations and MTC UEs may support coverage enhancements (CE) of up to 15 dB by some techniques, for example bundling. Coverage enhancement may also be referred to as coverage extension and range extension.

Other enhancements that may be made in LTE Rel-13 may include base stations transmitting paging signals in MTC physical downlink control channels (MPDCCHs) in a narrowband in order to page MTC UEs. An MPDCCH may convey paging signals for multiple MTC UEs and a downlink control information (DCI) to one or more other MTC UEs. MPDCCH may be similar to PDCCH/EPDCCH as described above. Demodulation reference signal (DMRS) based demodulation may be supported when using MPDCCH. That is, a BS transmitting an MPDCCH may transmit DMRS with the MPDCCH. A UE receiving the MPDCCH and DMRS may demodulate the MPDCCH based on the DMRS.

Figure 7:
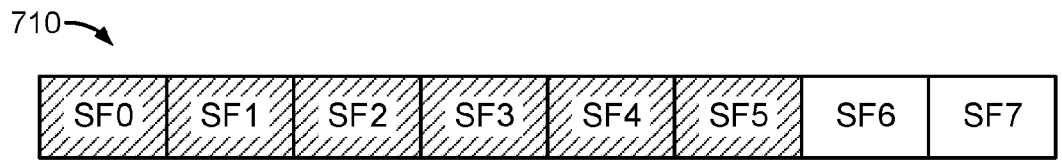
FIGS. 7-12 illustrate exemplary techniques for determining subframe availability for bundled transmissions, in accordance with certain aspects of the present disclosure.
Figure 7:
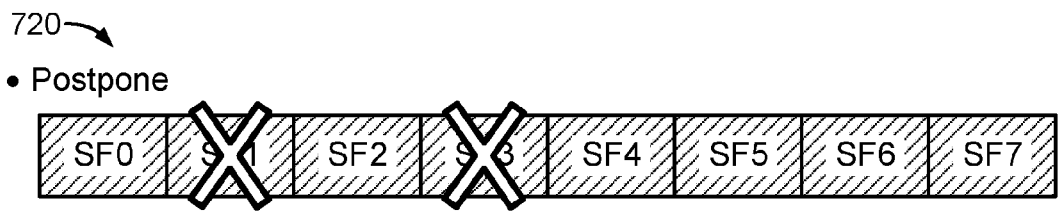
Figure 7:
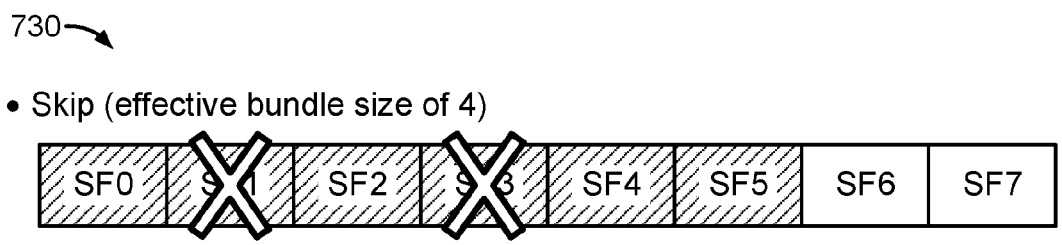

In order to achieve coverage enhancement (e.g. 15 dB CE), transmissions may be bundled (repeated) many times, for example, across multiple subframes. FIG. 7 illustrates an example 710 of bundling with a bundle (repetition) size of 6 (for uplink or downlink). One challenge when performing bundling, however, is that not all subframes are available for repetition. For example, a TDD subframe configuration may indicate certain subframes as DL, meaning they are not available for bundled UL transmissions or may indicate certain subframes as UL, meaning they are not available for bundled DL transmissions. In addition, certain subframes may be designated for other purposes, such as Multicast-broadcast single-frequency network (MBSFN) or enhanced MBSFN (eMBSFN) or for use as measurement gaps (e.g., for a UE to tune-away and take measurements on other frequencies).

In any case, aspects of the present disclosure provide techniques for addressing the fact that certain subframes may not be available for uplink and/or downlink bundled transmissions.

Figure 6:
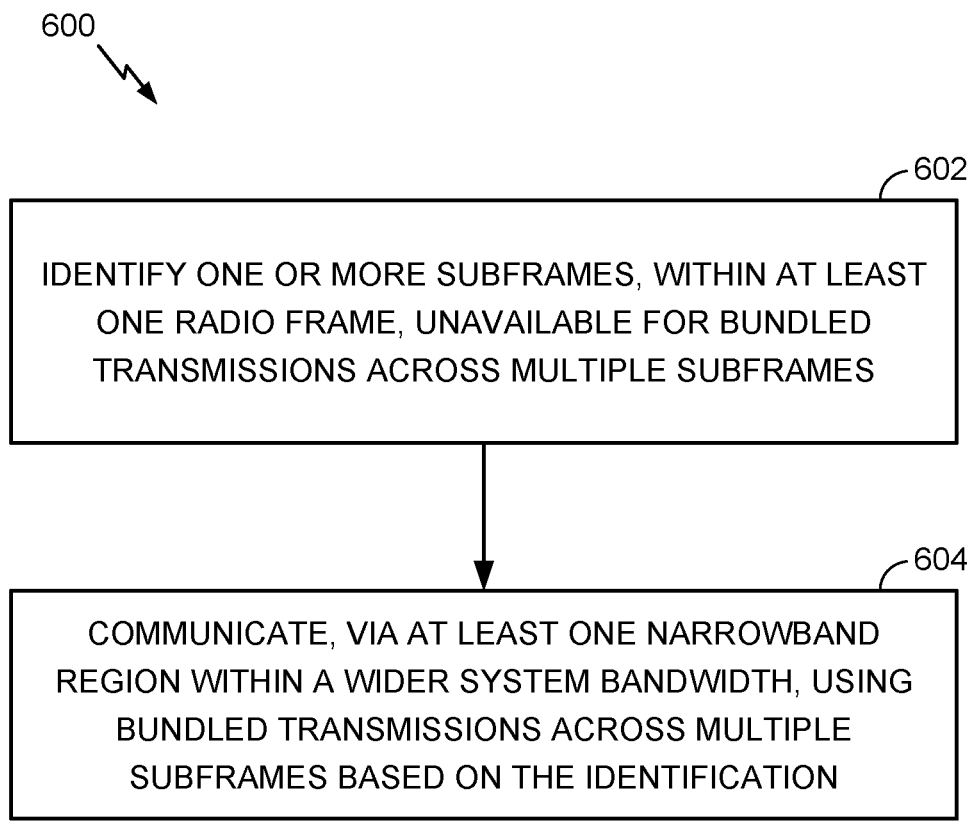
FIG. 6 illustrates an exemplary operation for wireless communications that may be performed by a UE, in accordance with certain aspects of the present disclosure.

FIG. 6 illustrates example operations 600 for wireless communications that may be performed by a UE (e.g., UE 120a in FIG. 1), such as an MTC UE.

Operation 600 begins at block 602, with the UE identifying one or more subframes, within at least one radio frame, unavailable for bundled transmissions across multiple subframes. At 604, the UE communicates, via at least one narrowband region within a wider system bandwidth, using bundled transmissions across multiple subframes based on the identification. As described herein, the communicating may be adjusted based on the classification of unavailable subframes (techniques of classifying are described herein). In some cases, communicating may be adjusted to skip bundled transmissions that would occur on one or more unavailable subframes of the second group to one or more later occurring (subsequent) subframes or to postpone bundled transmissions if they are scheduled to occur on one or more unavailable subframes of the first group and to schedule the postponed bundled transmissions to one or more later occurring subframes.

There are various options for exactly how a UE performs bundled transmissions given the unavailability of certain subframes, that would otherwise be scheduled for bundled transmissions. For example, referring again, to FIG. 7, unavailable subframes may be postponed, as shown in example 720, where transmissions that would have been transmitted on unavailable subframes SF1 and SF2 are postponed to SF6 and SF7. As another example, subframes may be skipped, as shown in example 730, where transmissions that would have been transmitted on unavailable subframes SF1 and SF2 are skipped altogether.

Figure 8:
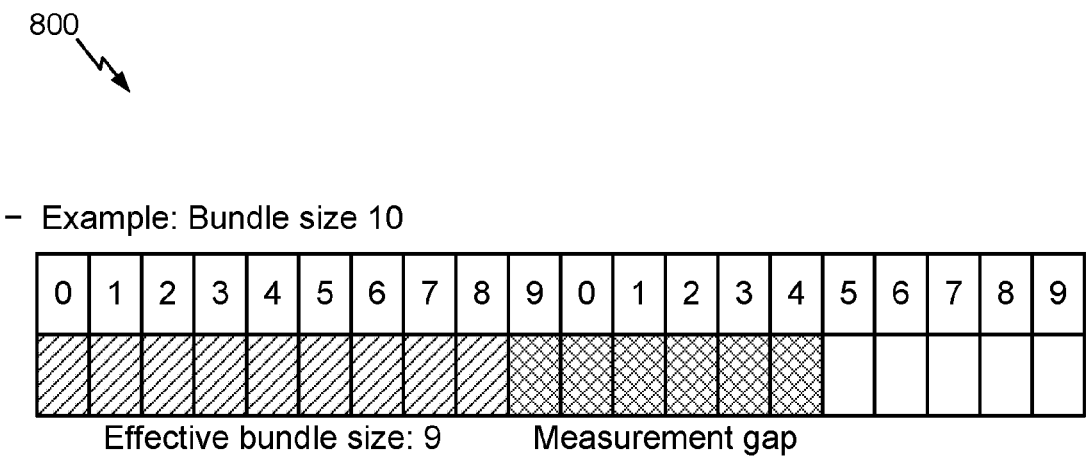
Figure 8:
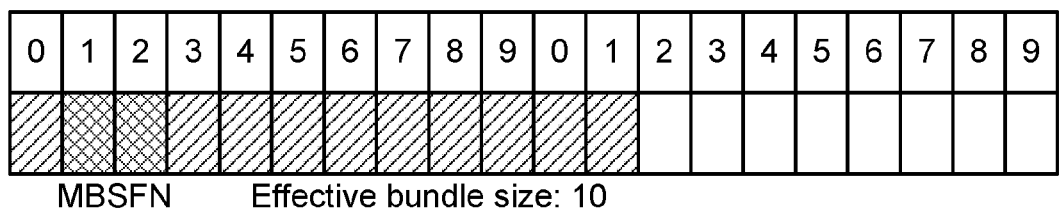

In some cases, how unavailable subframes are treated may depend on why they are unavailable. For example, subframes not available may be classified into two groups. A first group (Group 1) may include subframes not available to any eMTC UE (e.g., due to MBSFN or TDD). Group 1 subframes are typically signaled in broadcast transmissions (e.g., SIB). A second group (Group 2) may include subframes not available to a particular UE (e.g., because of a collision with measurement gap). Group 2 subframes are typically signaled in a per-UE basis (e.g. RRC). As illustrated in FIG. 8, which shows an example with a bundling size of 10, subframes of Group 1 may be postponed, while subframes in Group 2 may be skipped (resulting in an effective bundling size less than 10).

In some cases, TDD subframe configurations may be dynamically updated for example, based on enhanced Interference Mitigation and Traffic Adaptation (eIMTA) schemes. This may present challenges for eMTC UEs trying to determine availability of subframes for bundled transmissions. Dynamic TDD configurations are typical signaled in PDCCH common search space.

Figure 9:
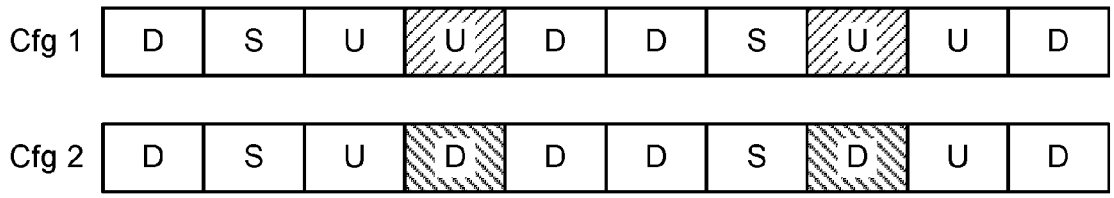

Unfortunately, eMTC UEs may not be able to track the TDD configuration changes because of being narrowband or in coverage enhancement. Further, signaling eIMTA configurations to eMTC UEs may be costly (repeating in many narrowbands) or not possible (bundle size for M-PDCCH is longer than eIMTA update period). Using a default TDD configuration may not work in general for bundled uplink and downlink transmission. For example, as illustrated in FIG. 9, in a cell with eIMTA switching between configurations 1 and 2, UL bundled transmissions (on SF3 and SF7) by a UE using configuration 1 would collide with DL transmissions (also on SF3 and SF7 ) if the cell is using configuration 2. In another example, DL bundled transmissions (on SF3 and SF7) by a UE using configuration 2 would collide with UL transmissions (also on SF3 and SF7) if the cell is using configuration 1.

Figure 10:
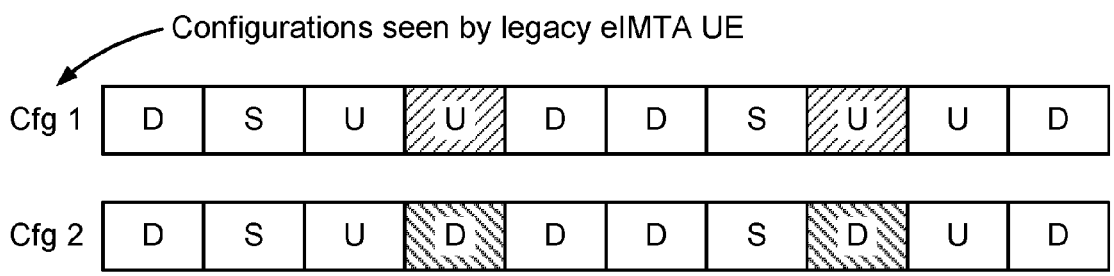
Figure 10:
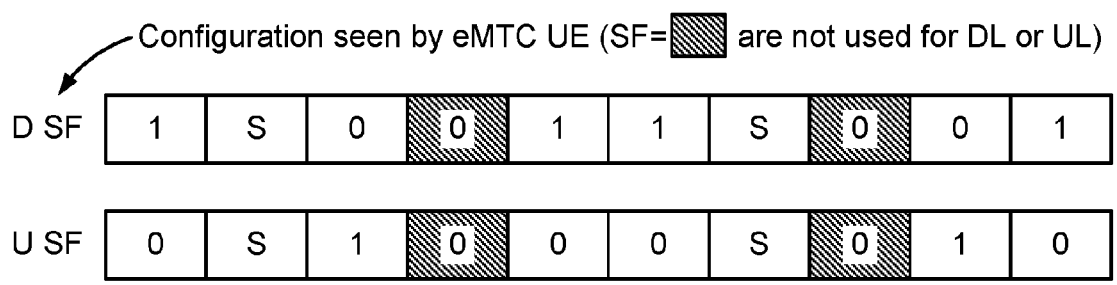

One approach to address dynamically signal SF configurations, such as in eIMTA, is to configure a UE with some subframes for uplink and some for downlink. As illustrated in FIG. 10, the signaling may be provided via a bitmap indicating subframe availability. The top diagram in FIG. 10 illustrates the actual UL/DL subframe configurations seen by "legacy" eIMTA UEs, while the bottom diagram illustrates the availability of UL/DL subframes for bundled transmissions based on the bitmaps. It is possible to also include information on subframe availability not related to TDD, e.g. MBSFN subframes or subframes that the eNB want to reserve for legacy users.

Another option is to configure eMTC UEs with one TDD subframe configuration for uplink and a different one for downlink. For example, a UE may use configuration 1 for downlink and configuration 2 for uplink (effectively avoiding collisions). In some cases, an MTC UE may reuse certain same fields as legacy UE (e.g., that may have to be transmitted on eMTC SIB). For example, these may include TDD Configuration from SIB1 used for DL subframes or HARQ-ReferenceConfig (eIMTA configuration) used for U subframes.

In some cases, if an LTE eMTC uplink subframes are (explicitly) scheduled, a UE may just follow the downlink grant. In some cases, for UE without coverage enhancement (no bundling-or with small coverage enhancement), the UE follow an uplink grant. As an example, if a grant is received for subframe M, then the UE may transmit uplink on subframe M regardless of the TDD (or HARQ-ReferenceConfig) configuration.

For a UE in coverage enhancement, bundling may be needed for both uplink and downlink, so the available uplink subframes may be given by HARQ-ReferenceConfig or a similar field. In some cases, for a UE that does not need MPDCCH bundled but bundled PUSCH, for a current radio frame, the UE may use the scheduled subframe plus subframes indicated in a HARQ-ReferenceConfig. For other radio frames (e.g., if bundling size is long) the UE may only use subframes indicated as available for bundling via HARQ-ReferenceConfig. This approach may be useful for small uplink bundle size (e.g. 2). In some cases, a UE may simply use the broadcast (SIB) configuration, if a certain configuration is broadcast (e.g., cfg #0). Otherwise, the UE may use another (reference) configuration.

Figure 11:
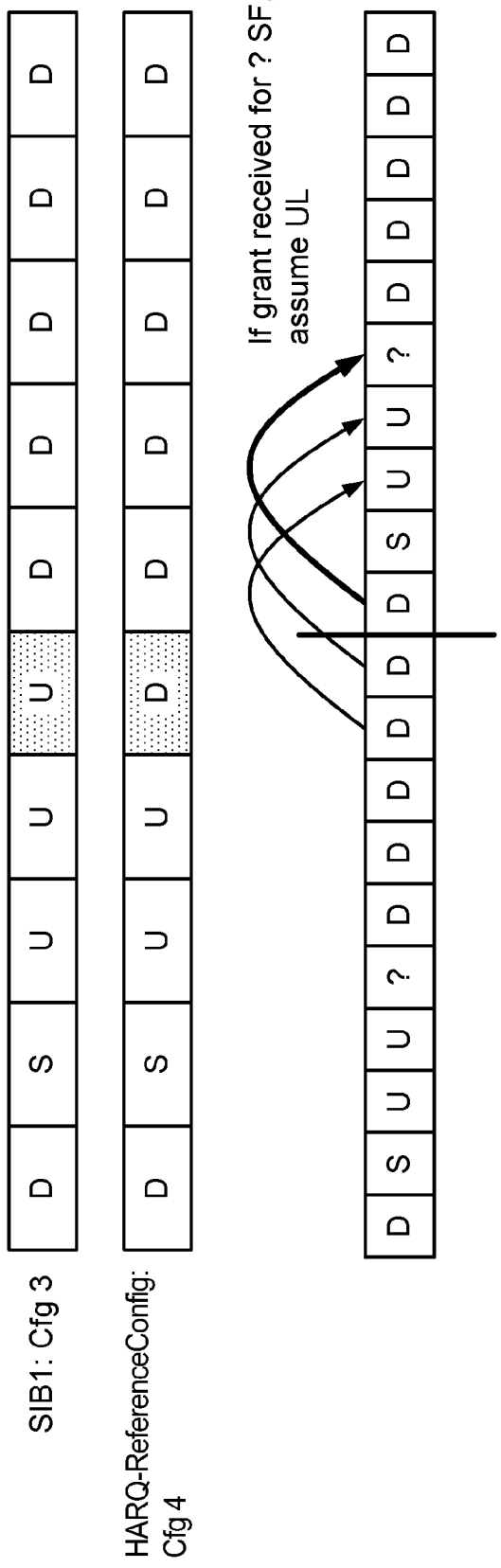
Figure 12:
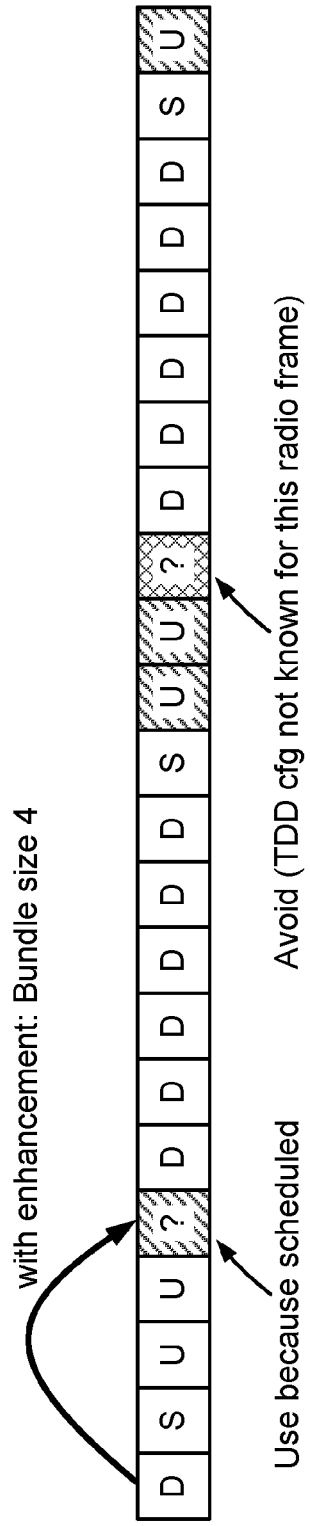

FIG. 11 illustrates an example where the SIB broadcast configuration is Configuration 3, while the HARQ-ReferenceConfig is Configuration 4. In the illustrated scenario, if an (explicit) grant is received for a subframe whose availability is unknown (the subframe marked as "?"), the UE may assume that is an UL subframe and, at least for this radio frame, use that subframe for a bundled UL transmission. On the other hand, in the example illustrated in FIG. 12, when a subframe availability is unknown the UE may avoid this subframe absent an explicit grant.

In some cases, a UE may determine subframe availability differently for different channels (e.g., mPDCCH and PDSCH scheduled mPDCCH, Broadcast PDSCH vs. unicast PDSCH, or mPDCCH based PDSCH vs. mPDCCH-less PDSCH). One possible example is that for unicast PDSCH, subframe availability may be somehow indicated in DCI itself, albeit with limited information. For example, an eNB may configure a reference configuration for mPDCCH, broadcast PDSCH, and mPDCCH-less PDSCH. The eNB may separately configure a reference configuration for unicast mPDCCH-based PDSCH (e.g., for no or low coverage enhancement cases). For example, two configurations may be signaled in SIB1, and a bit in DCI may be used to switch between these two. Such a mode may be enabled in a per-UE basis (e.g. RRC configuration).

In some cases, special subframe configurations may be signaled separately to legacy UEs and eMTC UEs. For example, the update period for system information (SI) carrying subframe configuration information may be different for eMTC and regular UEs. This may also imply that that DMRS configuration may be different for both types of UE. In such cases, it might not be possible to multiplex legacy UE and LC UE in the same RB for MPDCCH/PDCCH for special subframes. In some cases, the UE receives SI updates regarding subframe configurations with a different periodicity than UEs that do not communicate via the narrowband region.

Figure 13:
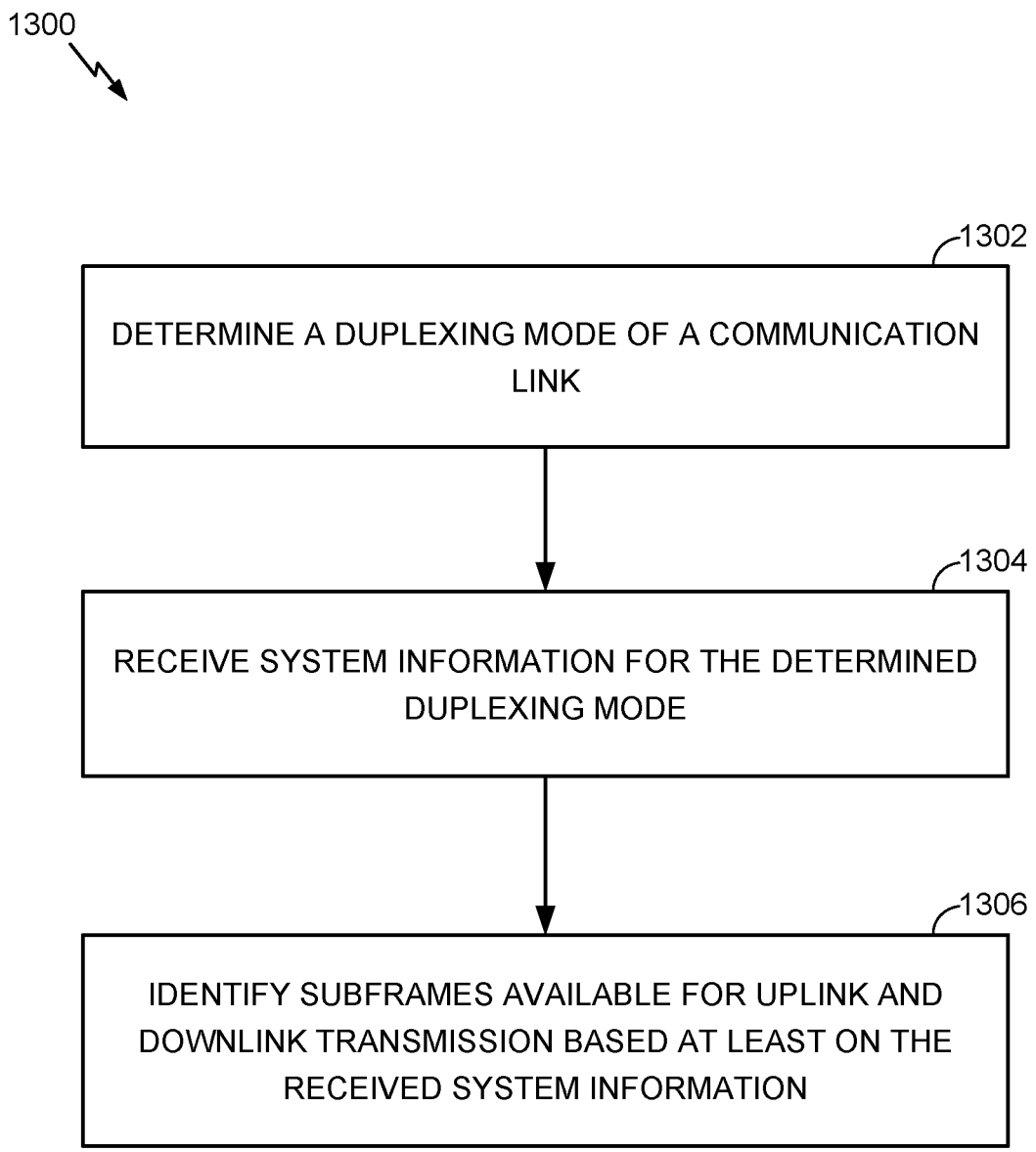
FIG. 13 illustrates an exemplary operation for wireless communications that may be performed by a UE, in accordance with certain aspects of the present disclosure.

In some cases, subframe availability may be signaled for deployments of different duplexing modes. For example, FIG. 13 illustrates example operations 1300 that may be performed by a UE to receive signaling of subframe availability in TDD and FDD deployments.

The operations 1300 begin, at 1302, by determining a duplexing mode of a communication link. At 1304, the UE receives system information for the determined duplexing mode. At 1306, the UE identifies subframes available for uplink and downlink transmission based at least on the received system information.

This subframe availability may account for various types of subframe configurations, such as dynamic TDD configurations, almost blank subframe (ABS) configurations, MBSFN configurations or more generally, for any subframes that for scheduling reasons, the eNB does not want to use for eMTC. For example, in TDD mode, an eNB may signal if a subframe is available for uplink, downlink or neither. In FDD, the eNB may signal if a subframe is available for uplink, downlink, both or neither.

In such cases, it might be beneficial to use different signaling schemes in TDD and FDD to minimize the signaling overhead. For example, the subframe availability for FDD may be determined by two bitmasks, where the first bitmask signals the available subframes for downlink and the second bitmask signals the available subframes for uplink.

The subframe availability for TDD, on the other hand, may be determined by a TDD configuration and a (single) bitmask, where the bitmask signals if a subframe is available, and the TDD configuration signals the direction of the subframe. If a subframe is not available (as indicated by the mask), then that subframe may be unavailable for uplink or downlink. If a subframe is available, then the direction of that subframe is given by the TDD configuration.

This type of signaling may be demonstrated by considering an example with the following TDD configuration:
   DSUUDDSUUD
and the following bitmask to indicate subframe availability:
   1101111110
In this case, the available downlink subframes are:
   0,1,4,5,6 (SF9 is disabled in the mask)
as SF9 is disabled in the mask, while the available downlink subframes are:
   1,3,6,7,8 as SF2 is disabled in the mask. The subframe availability bitmask may be of different lengths, depending on the particular embodiment. For example, a bitmask may have 10 bits (signaling every radio frame), 40 bits (signaling every 4 radio frames), or a reduced size (e.g., assuming that subframes 0 and 5 are always available, or assuming that paging subframes are always available).

In some cases, a UE may take action when one or more subframes are identified for conflicting purposes. For example, in some cases, a UE may be configured for periodic CSI reporting, meaning certain subframes need to be uplink for transmitting the CSI. In the event these subframes are instead scheduled for downlink transmissions, a UE may need to take action to resolve this conflict (or collision). In some cases, a UE may give priority to transmitting CSI. For example, a UE may determine a set of the subframes scheduled for periodic transmission of channel state information (CSI) and determine a set of subframes scheduled for physical downlink shared channel (PDSCH) transmission. The UE may drop periodic transmission of CSI if the set of subframes scheduled for transmission of periodic CSI at least partially overlaps with the set of subframes scheduled for PDSCH transmission. In other words, receiving PDSCH may be given priority over transmission of CSI (resulting in dropping of CSI transmissions).

Figure 14:
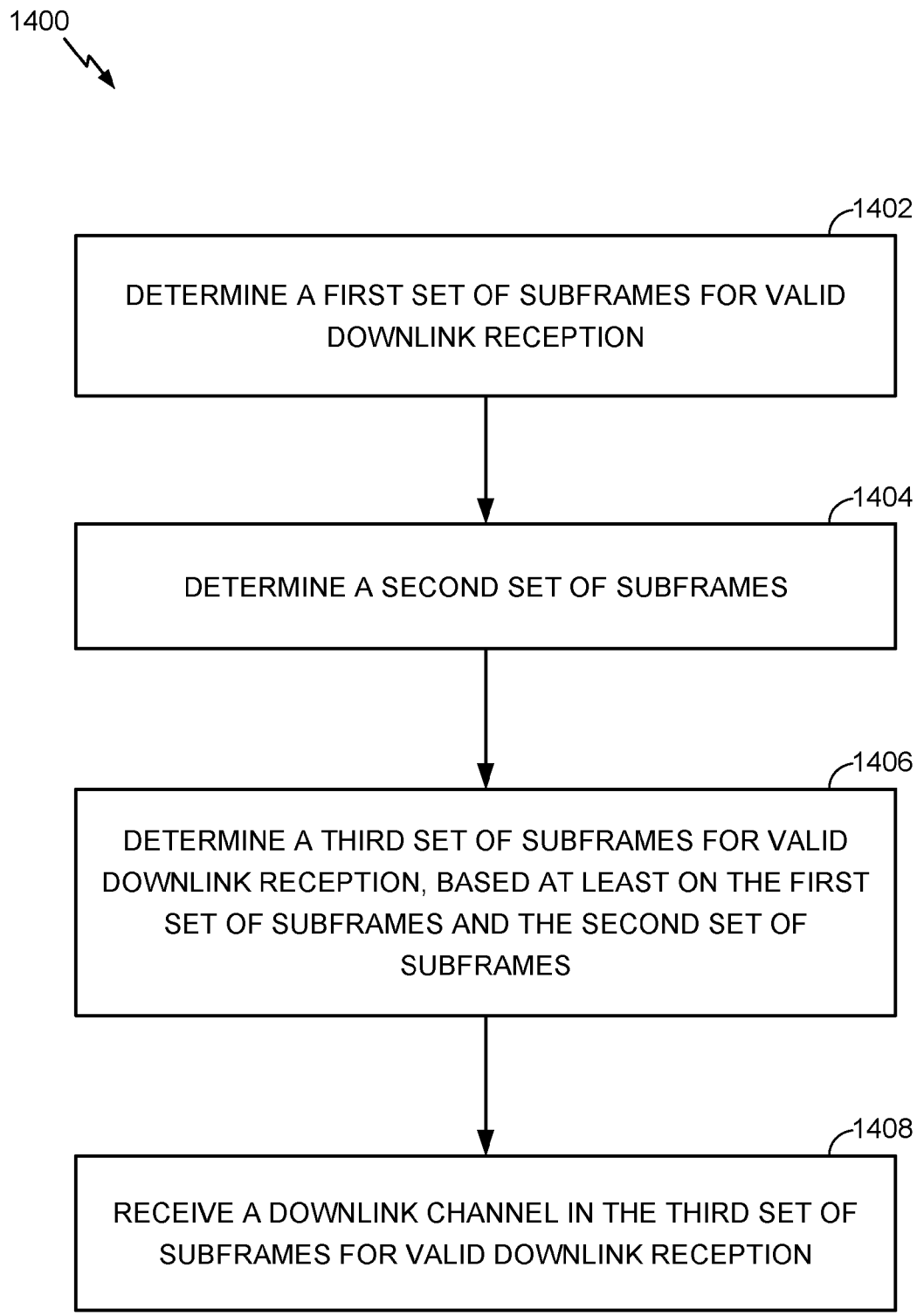
FIG. 14 illustrates an exemplary operation for wireless communications, in accordance with certain aspects of the present disclosure.

In some cases, the eNB may signal an indication of valid downlink subframes and an indication of subframe a different type (e.g., MBSFN or special subframes). Based on these indications, a UE may determine the validity of either the downlink subframes or the subframes of the different type FIG. 14 illustrates example operations 1400 that may be performed by a UE to determine validity of different types of subframes, based on such indications.

The operations 1400 begin, at 1402, by determining a first set of subframes for valid downlink reception. At 1404, the UE determines a second set of subframes and, at 1406, the UE determines a third set of subframes for valid downlink reception, based at least on the first set of subframes and the second set of subframes. At 1408, the UE receives a downlink channel in the third set of subframes for valid downlink reception.

As an example, the second set of subframes may be MBSFN subframes. In some cases, the UE may be configured to override the valid downlink subframe configuration with the MBSFN subframe configuration. For example, the UE may receive an indication that a particular subframe is valid (e.g., for downlink), but is also marked as MBSFN. In this case, the UE may override the valid (downlink) subframe configuration, and consider the particular subframe to be invalid.

In some cases, a UE may be configured to set the availability of downlink subframes to be different for different transmission modes or channels. For example, an eNB may configure some MBSFN subframes as valid, in which CRS are not present. If this is the case, a UE may not be able to receive PDSCH with CRS demodulation (e.g. transmission modes 1, 2 or 6), but may be able to receive PDSCH with DMRS demodulation (e.g. transmission mode 9) and/or MPDCCH with DMRS demodulation. Thus, the subframe availability may be a function of the channel and/or transmission mode. If a subframe is not available (e.g., due to the non-compatibility of the channel/transmission mode with MBSFN), then the UE may skip reception in this particular subframe and count it in the total repetition number. Alternatively, the UE may postpone the repetition in the MBSFN subframe.

Similarly, some special subframes may be configured as valid downlink subframes. In such a case, some transmission modes may not be available in the special subframe. For example, transmission mode 9 may not be supported in special subframes with extended CP and 5:5:2 special subframe configuration. In such a case, the UE may skip reception in this particular subframe and count it in the total repetition number. Alternatively, the UE may postpone the repetition in the special subframe.

In some cases, and in TDD deployments, a bundled downlink transmission may comprise both normal and special subframes. For some channels, the availability of resources may be different in normal and special subframes. For example, following legacy LTE, a downlink control channel for eMTC (MPDCCH) normal subframes may have 4 enhanced control channel elements (ECCEs) per RB, while some special subframes may have 2 ECCEs per RB. In this case, if a MPDCCH is repeated in the special subframe, some ECCEs may not be available for repetition. For example, a normal subframe may have ECCEs {0,1,2,3} and a special subframe may have ECCEs {0,1}, so not all the ECCE may be repeated.

In some cases, a candidate MPDCCH spanning a number of ECCEs (e.g. {0,1,2,3}) may not be completely repeated in the special subframe (e.g. the repetition will only use {0,1}). In some other cases, there may be two candidates for monitoring, for example candidate 1 spanning ECCEs {0,1}, and candidate 2 spanning ECCEs {2,3}. Thus, in this example, only candidate 1 may be repeated in the special subframe, and candidate 2 may not be repeated in the special subframe. In this case, the eNB may transmit DMRS in the special subframe, regardless of the candidate being repeated/transmitted or not.

Alternatively, the number of ECCEs per RB may be defined depending on the number of repetitions. For example, if a UE is configured without MPDCCH repetition, it may receive MPDCCH in the special subframes with 2 ECCEs per RB. If a UE is configured with MPDCCH repetition, then the special subframes may have 4 ECCE per RB such that all the candidates can be repeated. In some other cases, the UE may treat the special subframe as invalid when configured with MPDCCH repetition. For example, if a UE is monitoring for an MPDCCH transmitted with repetitions, the special subframes with 2 ECCE per RB may be considered invalid subframes.

As described herein, aspects of the present disclosure provide techniques that may allow eMTC UEs, hat rely on bundled transmissions for coverage enhancement, to contend with the fact that certain subframes are unavailable for such bundled transmissions.

As described above, aspects of the present disclosure provide techniques for addressing the fact that certain subframes may not be available for uplink and/or downlink bundled transmissions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software/firmware or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
   identifying one or more subframes, within at least one radio frame, unavailable for bundled transmissions across multiple subframes, wherein the identifying comprises classifying unavailable subframes into at least a first group comprising subframes that are determined not available for transmission to any UE that communicates using a narrowband region within a wider system bandwidth and a second group comprising subframes that are determined not available for bundled transmissions to one or more particular UEs; and communicating, via at least the narrowband region, using bundled transmissions across multiple subframes based on the identification.

2. The method of claim 1, wherein the communicating is adjusted to:
skip bundled transmissions that would occur on one or more unavailable subframes of the second group to one or more later occurring subframes; or
postpone bundled transmissions if they are scheduled to occur on one or more unavailable subframes of the first group and to schedule the postponed bundled transmissions to one or more later occurring subframes.

3. The method of claim 1, wherein the identification is based, at least in part, on dynamically scheduled subframe configurations.

4. The method of claim 3, further comprising receiving signaling indicating at least one of: availability of subframes for bundled uplink transmissions or availability of subframes for bundled downlink transmissions.

5. The method of claim 4, wherein the signaling is provided via one or more bitmaps.

6. The method of claim 4, wherein the signaling is provided via:
a first subframe configuration for determining availability of subframes for bundled downlink transmissions; and
a second subframe configuration for determining availability of subframes for bundled uplink transmissions.

7. The method of claim 6, further comprising:
determining whether or not the UE is in a coverage enhancement (CE) mode; and
transmitting using a subsequent subframe based on the determination.

8. The method of claim 6, further comprising:
receiving a grant indicating a subsequent subframe is available for uplink transmission; and
for at least a current radio frame, transmitting using the subsequent subframe and subframes indicated as available based on the second subframe configuration.

9. The method of claim 1, wherein the identification is based, at least in part on a type of channel subject to bundled transmission.

10. The method of claim 9, wherein:
the identification is based on a first reference subframe configuration for a first set of one or more channel types; and
the identification is based on a second reference subframe configuration for a second set of one or more channel types.

11. The method of claim 1, wherein the UE receives system information (SI) updates regarding subframe configurations with a different periodicity than UEs that do not communicate via the narrowband region.

12. An apparatus for wireless communications, comprising:
at least one processor configured to identify one or more subframes, within at least one radio frame, unavailable for bundled transmissions across multiple subframes, wherein the identifying comprises classifying unavailable subframes into at least a first group comprising subframes that are determined not available for transmission to any UE that communicates using a narrowband region within a wider system bandwidth and a second group comprising subframes that are determined not available for bundled transmissions to one or more particular UEs; and
an interface configured to communicate, via at least the narrowband region, using bundled transmissions across multiple subframes based on the identification.

13. The apparatus of claim 12, wherein the communication is adjusted to:
skip bundled transmissions that would occur on one or more unavailable subframes of the second group to one or more later occurring subframes; or
postpone bundled transmissions if they are scheduled to occur on one or more unavailable subframes of the first group and to schedule the postponed bundled transmissions to one or more later occurring subframes.

14. The apparatus of claim 12, wherein the identification is based, at least in part, on dynamically scheduled subframe configurations.

15. The apparatus of claim 14, wherein the interface is configured to receive signaling indicating at least one of: availability of subframes for bundled uplink transmissions or availability of subframes for bundled downlink transmissions.

16. The apparatus of claim 15, wherein the signaling is provided via one or more bitmaps.

17. The apparatus of claim 15, wherein the signaling is provided via:
a first subframe configuration for determining availability of subframes for bundled downlink transmissions; and
a second subframe configuration for determining availability of subframes for bundled uplink transmissions.

18. The apparatus of claim 17, wherein:
the at least one processor is further configured to determine whether or not the UE is in a coverage enhancement (CE) mode; and
the interface is configured to communicate using a subsequent subframe based on the determination.

19. The apparatus of claim 17, wherein:
the interface is configured to receive a grant indicating a subsequent subframe is available for uplink transmission; and
the interface is configured, for at least a current radio frame, to communicate using the subsequent subframe and subframes indicated as available based on the second subframe configuration.

20. The apparatus of claim 12, wherein the identification is based, at least in part on a type of channel subject to bundled transmission.

21. The method of claim 20, wherein:
the identification is based on a first reference subframe configuration for a first set of one or more channel types; and
the identification is based on a second reference subframe configuration for a second set of one or more channel types.

22. An apparatus for wireless communications, comprising:
means for identifying one or more subframes, within at least one radio frame, unavailable for bundled transmissions across multiple subframes, wherein the identifying comprises classifying unavailable subframes into at least a first group comprising subframes that are determined not available for transmission to any UE that communicates using a narrowband region within a wider system bandwidth and a second group comprising subframes that are determined not available for bundled transmissions to one or more particular UEs; and means for communicating, via at least the narrowband region, using bundled transmissions across multiple subframes based on the identification.

23. A non-transitory computer-readable medium encoded with instructions that when executed, cause a user equipment (UE) to:

identify one or more subframes, within at least one radio frame, unavailable for bundled transmissions across multiple subframes, wherein the identifying comprises classifying unavailable subframes into at least a first group comprising subframes that are determined not available for transmission to any UE that communicates using a narrowband region within a wider system bandwidth and a second group comprising subframes that are determined not available for bundled transmissions to one or more particular UEs; and communicate, via at least the narrowband region, using bundled transmissions across multiple subframes based on the identification.

\* \* \* \* \*